(12) United States Patent
Han et al.

(10) Patent No.: US 9,400,627 B2
(45) Date of Patent: Jul. 26, 2016

(54) DISPLAY INCLUDING SIGNAL TRANSMISSION SCHEME USING OPTICAL INTERCONNECTION AND ELECTRICAL INTERCONNECTION

(71) Applicant: Samsung Electronics Co., Ltd., Suwon-si (KR)

(72) Inventors: Seung-hoon Han, Seoul (KR); Hong-pyo Kim, Goyang-si (KR); Taek-jong Ahn, Seongnam-si (KR); Byung-tae Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 14/100,447

(22) Filed: Dec. 9, 2013

(65) Prior Publication Data

US 2014/0160077 A1    Jun. 12, 2014

(30) Foreign Application Priority Data

Dec. 7, 2012  (KR) .......... 10-2012-0142313
Dec. 6, 2013  (KR) .......... 10-2013-0151717

(51) Int. Cl.
*G06F 3/14* (2006.01)
*G06F 3/041* (2006.01)

(52) U.S. Cl.
CPC . *G06F 3/14* (2013.01); *G06F 3/041* (2013.01)

(58) Field of Classification Search
CPC ................................. G06F 3/041; G06F 3/14
See application file for complete search history.

(56) References Cited

U.S. PATENT DOCUMENTS

| | | | |
|---|---|---|---|
| 5,050,961 A * | 9/1991 | Venolia | G02B 27/26 348/E13.038 |
| 5,663,739 A * | 9/1997 | Pommerenke | G06F 3/147 345/1.3 |
| 6,078,704 A | 6/2000 | Bischel et al. | |
| 7,948,450 B2 * | 5/2011 | Kay | G06F 1/1601 345/1.1 |
| 8,121,640 B2 | 2/2012 | Russ et al. | |
| 8,139,050 B2 | 3/2012 | Jacobson et al. | |
| 8,233,212 B2 | 7/2012 | Lipovetskaya et al. | |
| 9,058,149 B2 * | 6/2015 | Lin | G06F 3/1423 |
| 2004/0178719 A1 * | 9/2004 | Sun | H01L 27/3244 313/500 |
| 2004/0233125 A1 * | 11/2004 | Tanghe | G06F 3/1446 345/1.3 |
| 2009/0096711 A1 * | 4/2009 | Jang | G06F 3/1446 345/1.3 |
| 2010/0028019 A1 * | 2/2010 | Yu | G06F 3/1454 398/141 |
| 2011/0122048 A1 * | 5/2011 | Choi | G06F 3/1446 345/1.1 |
| 2011/0148888 A1 * | 6/2011 | Jacobs | G06T 1/00 345/502 |

FOREIGN PATENT DOCUMENTS

| | | | |
|---|---|---|---|
| KR | 1020000000807 A | 1/2000 | |
| KR | 1020000008250 A | 2/2000 | |
| KR | 1020030091171 A | 12/2003 | |
| KR | 1020050060065 A | 6/2005 | |
| KR | 1020050101499 A | 10/2005 | |
| KR | 1020100054811 A | 5/2010 | |

* cited by examiner

*Primary Examiner* — Ariel Balaoing
(74) *Attorney, Agent, or Firm* — Sughrue Mion, PLLC

(57) ABSTRACT

A display employing a signal transmission scheme using an optical interconnection together with an electrical interconnection is provided. The display includes a screen including a plurality of sub displays configured to display information, a plurality of sub signal processors electrically connected to the plurality of sub displays, the sub signal processors being configured to perform conversion between an optical signal and an electrical signal, and a main signal processor optically connected to at least a portion of the plurality of sub signal processors.

29 Claims, 3 Drawing Sheets

DISPLAY INCLUDING SIGNAL TRANSMISSION SCHEME USING OPTICAL INTERCONNECTION AND ELECTRICAL INTERCONNECTION

CROSS-REFERENCE TO RELATED APPLICATIONS

This application claims the benefit of Korean Patent Application No. 10-2012-0142313, filed on Dec. 7, 2012, in the Korean Intellectual Property Office, and this application also claims the benefit of Korean Patent Application No. 10-2013-0151717, filed on Dec. 6, 2013, in the Korean Intellectual Property Office, the disclosures of which are incorporated herein in their entireties by reference.

BACKGROUND

1. Field

The present disclosure relates to a display, and more particularly, to a display including a signal transmission scheme using an optical interconnection together with an electrical interconnection.

2. Description of the Related Art

A display through which a user can experience a sense of realism and be easily engaged may be a type of display that can satisfy the demands of users.

When the state of content provided through a display is highly realistic, the size of the display is large and the content is processed in real time while maintaining a high resolution, the user may experience a sense of realism from the content provided through the display and be easily engaged by the content. For a large screen, a portion of a building such as a wall, a ceiling or a floor may be used.

In order to maintain a high overall resolution in such a large display or a large screen, the distance for pixel addressing increases and the number of pixels necessary to be processed to form a frame increases. As a result, the pixel rate may increase. This condition may increase a resistance-capacitance (RC) delay and ultimately make real time processing difficult.

In addition, a real three-dimensional (3D) display or a hologram display based on an ultrafine size pixel or an ultra high speed pixel may be implemented in a small or a medium size display including a television (TV). In this case, real time processing may be difficult due to an RC delay caused by limitations in the number of pixels and in the thickness of electrical interconnections.

SUMMARY

Exemplary embodiments provide displays which implement mixed interconnections to reduce limitations caused by an existing resistance-capacitance (RC) delay.

According to an aspect of an exemplary embodiment, there is provided a display including: a screen including a plurality of sub displays configured to display information: a plurality of sub signal processors electrically connected to the plurality of sub displays, the sub signal processors being configured to perform conversion between an optical signal and an electrical signal; and a main signal processor optically connected to at least a portion of the plurality of sub signal processors.

In the display, each region of the plurality of sub displays may have a size inversely proportional to an RC delay value of the respective region.

The plurality of sub displays is configured in a one to one correspondence with the plurality of sub signal processors.

The main signal processor may be disposed at a center of the display.

The main signal processor may be disposed outside the screen of the display.

The main signal processor may include a converting element configured to convert an input signal having a first characteristic into an output signal having a second characteristic.

Each of the sub signal processors may include an electrical-to-optical converting element configured to convert an electrical signal received from a corresponding one of the sub displays into an optical signal.

The main signal processor may include a hub configured to connect the main signal processor to the sub signal processors, a router configured to route data to and from the sub signal processors, and a processor to process the data.

Each of the sub signal processors may include an optical transceiver configured to perform the conversion between the optical signal and the electrical signal.

The main signal processor and the sub signal processors may be connected by using optical interconnections. The optical interconnections may be one of optical fibers and silicon-based optical waveguides.

The display may include one of a glass substrate, a flexible substrate, and a silicon-based substrate.

The display may be a stereoscopic display or a non-glasses real three-dimensional (3D) display.

The input signal having the first characteristic may be one of an electrical signal and an optical signal.

The output signal having the second characteristic may be one of an electrical signal and an optical signal.

The converting element may be one of an optical-to-electrical converting element, an electrical-to-optical converting element and an optical-to-optical converting element.

At least one sub main signal processor may be disposed between the main signal processor and the plurality of sub signal processors. The main signal processor and the sub main signal processor respectively may include a hub configured to connect the main signal processor and the sub main signal processor to other components, a router configured to route data to and from the other components, and a processor configured to process the data.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
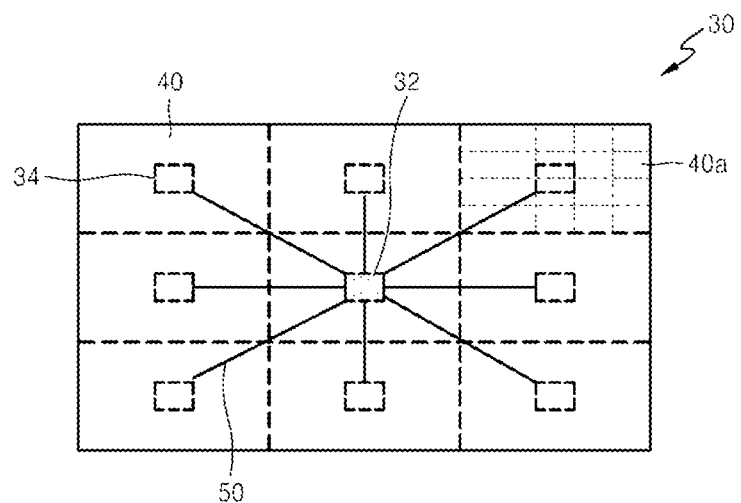
FIG. 1 is a front view illustrating an arrangement of sub displays and sub signal processors of a display employing a signal transmission scheme using optical interconnections and electrical interconnections, according to an exemplary embodiment.

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

FIG. 1 is a front view of a display according to an exemplary embodiment. According to exemplary embodiments, the display may be implemented as a stereoscopic display or a non-glasses (glasses-free) real three-dimensional (3D) display, although is not limited thereto.

Referring to FIG. 1, a screen 30 of a display according to an exemplary embodiment includes a plurality of sub displays 40. Each of the plurality of sub displays 40 includes a plurality of pixels 40a. For convenience of description and illustration, the screen 30 is illustrated to include nine sub displays 40 in FIG. 1. However, it is understood that the screen 30 may include a larger or smaller number of sub displays 40. The sub displays 40 may form a complete grid arrangement as a matrix. All screen sizes of the sub displays 40 may be the same. Alternatively, the screen sizes of the sub displays 40 may differ according to regions. The screen sizes of the sub display 40 may be related to a resistance-capacitance (RC) delay.

For example, when a frame rate of each sub display is f and the number of horizontal pixel lines is l, a required time τ necessary to turn on a single pixel is greater than the maximum electrical RC delay time (an electrical RC delay time taken to turn on the last end pixel of a horizontal line) as shown in Equation 1 as follows:

$$\tau = [1/(f \times l)] > R_{line} \times C_{line}$$ Equation (1)

When the RC delay time of electrical interconnections of the sub displays 40 is known, the maximum number of pixels and a physical size of the sub displays 40 may be determined from a relationship between a given frame rate and the number of the horizontal pixel lines. The number of pixels and the physical size of the sub displays 40 may differ according to kinds of the displays. Also, sizes of the sub displays may differ for each display according to purpose of usage or other factors.

Referring to Equation 1, the required time τ may be greater than R×C, for example, equal to or greater than a product of R×C or three to five times the product of R×C.

Figure 3:
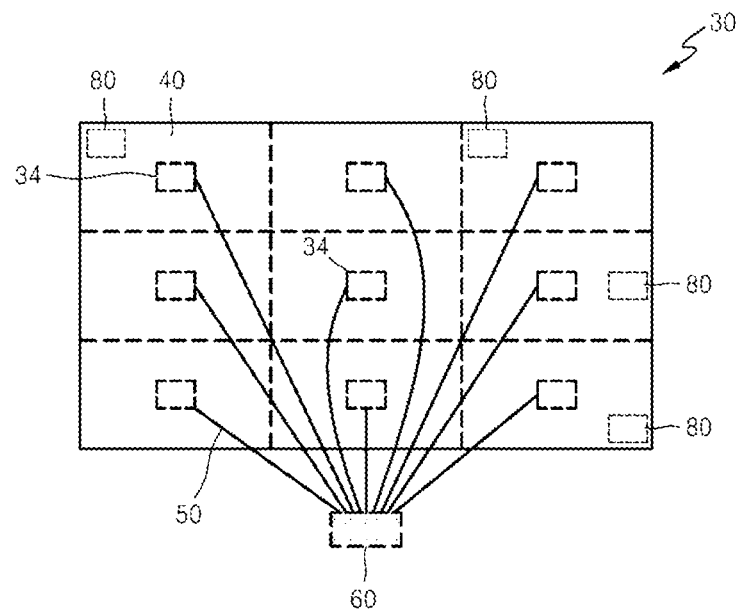
FIG. 3 is a front view illustrating a case where a main signal processor of FIG. 1 is disposed outside a screen and the sub signal processors are arranged asymmetrically according to an exemplary embodiment.

Referring to FIG. 1, each of the sub displays 40 may be electrically connected to the sub signal processors 34. The display according to an exemplary embodiment may include as many sub signal processors 34 as the number of the sub displays 40. The sub signal processors 34 may have a one to one correspondence with the sub displays 40, although are not limited thereto. The sub signal processors 34 may be respectively positioned immediately behind the sub displays 40 of the screen 30, or disposed at other positions. A main signal processor 32 or a gate signal processor is provided behind the sub display 40 which is positioned at the center of the screen 30, and may control the sub signal processors 34. The main signal processor 32 may be positioned outside the screen as illustrated in FIG. 3. The main signal processor 32 may be implemented to include a port which transmits and receives signals to and from the outside of the display. When the main signal processor 32 is implemented to include the port, the main signal processor 32 may play a role of an electrical-to-optical converter and an optical-to-electrical converter according to an input signal (information). In addition, when the main signal processor 32 is implemented to include the port and an optical signal is directly input from the outside, the main signal processor 32 may be configured as an optical-to-optical converter which converts the input optical signal to another optical signal and outputs the other optical signal.

The main signal processor 32 may also play a role of a sub signal processor. The main signal processor 32 may be formed of a hub, a router and a processor. According to exemplary embodiments, the hub connects the main signal processor 32 to other components (e.g., sub signal processors 34), the router routes information to and from other components, and the processor processes information. At least a portion of the sub signal processors 34 may also be formed of a hub, a router and a processor. Information such as a video, a short message or voice data, transmitted to the main signal processor 32, is converted to an optical signal and transmitted to the sub signal processors 34. The main signal processor 32 may receive information from the sub signal processors 34. For example, when the screen is a touch screen, information may be transmitted from a particular sub display to the main signal processor 32 according to a user's touch operation (e.g., touching the particular sub display). The information transmitted according to a user's touch operation may be transmitted to each of the sub signal processors 34 and each of the sub displays 40, and may also be transmitted to an information providing source which provides information to the display. The main signal processor 32 may include a converting element to perform the above-described information transmitting role. The converting element converts an input signal having a first characteristic to an output signal having a second characteristic. The input signal having the first characteristic may be any one of an electrical signal and an optical signal. The output signal having the second characteristic may be any one of an electrical signal and an optical signal. The converting element may be implemented as any one of an optical-to-electrical converter, an electrical-to-optical converter and an optical to optical converter.

Referring back to FIG. 1, the main signal processor 32 and each of the sub signal processors 34 are optically connected to each other. For example, optical fibers may be used as optical interconnections 50 connecting the main signal processor 32 and each of the sub signal processors 34. The optical fibers may be useful in a case where the display 30 is flexible. The optical interconnections 50 may be a dielectric-based optical waveguide. For example, the dielectric-based waveguide may be Si or SiN-based optical waveguides. The sub signal processors 34 may include an optical transceiver that may perform both optical-to-electrical conversion and electrical-to-optical conversion. The sub signal processors 34 may convert an optical signal received from the main signal processor 32 to an electrical signal and transmit the electrical signal to each pixel 40a. In this way, information may be displayed on the screen 30. Various types of schemes may be employed which enable the sub signal processors 34 to transmit the electrical signal to each pixel 40a. For example, the electrical signal generated by the optical-to-electrical conversion in the sub signal processors 34 may be transmitted to each pixel 40a using existing electrical addressing schemes. The sub signal processors 34 may each include a processor. The processor controls a process of transmitting the electrical signal to each pixel 40a through the electrical interconnections. In addition, the processor controls a process of converting the electrical signal transmitted from each pixel 40a to an optical signal, or transmitting the electrical signal to the main signal processor 32 without conversion to an optical signal.

According to an exemplary embodiment, each of the sub signal processors 34 may be synchronized with each other in order for the entire screen 30 to display information in real time. The display according to an exemplary embodiment may be implemented as a glass-based panel such as a liquid crystal display (LCD) or an active-matrix organic light-emitting diode (AMOLED) display, or may be implemented as a silicon-based display such as a liquid crystal on silicon (LCoS)-based spatial optical modulator (SLM).

Figure 2:
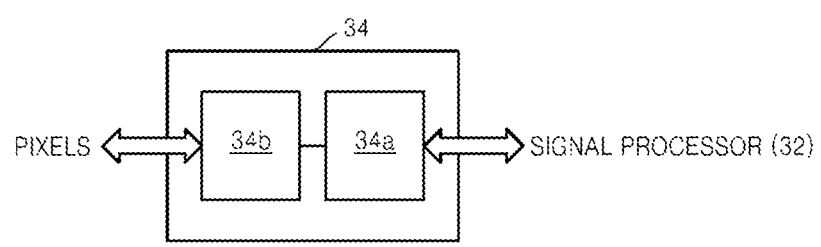
FIG. 2 is a cross-sectional view illustrating an example of a configuration of one of the sub signal processors of FIG. 1.

FIG. 2 illustrates another example of a configuration of the sub signal processors 34 of FIG. 1.

Referring to FIG. 2, the sub signal processor 34 includes an optical element 34a for performing optical-to-electrical conversion and electrical-to-optical conversion, and an addressing element 34b for addressing an electrical signal received from the optical element 34a to each pixel. The addressing element 34b may also play a role of transmitting an electrical signal received from pixels according to a user's touch to the optical element 34a.

FIG. 3 illustrates a display according to another exemplary embodiment.

Referring to FIG. 3, a main signal processor 60 transmits optical information to each of the sub signal processors 34. Also, the main signal processor 60 redistributes an optical signal or an electrical signal received from each of the sub signal processors 34 to an information providing source or to the sub displays 40.

The main signal processor 60 in FIG. 3 is distinct from the main signal processor 32 of FIG. 1 in that the main signal processor 60 in FIG. 3 does not perform pixel addressing for the sub displays. Even though the main signal processor 60 is shown in FIG. 3 as being disposed outside the screen 30, the main signal processor 60 may also be disposed behind the screen 30 or in another location. In addition, the sub signal processors 34 may be arranged symmetrically in a square grid form, or may be arranged asymmetrically in locations represented by rectangles 80 having thin dotted line borders in FIG. 3. It is understood that the locations of the rectangles 80 are not limited to the locations shown in FIG. 3.

Figure 4:
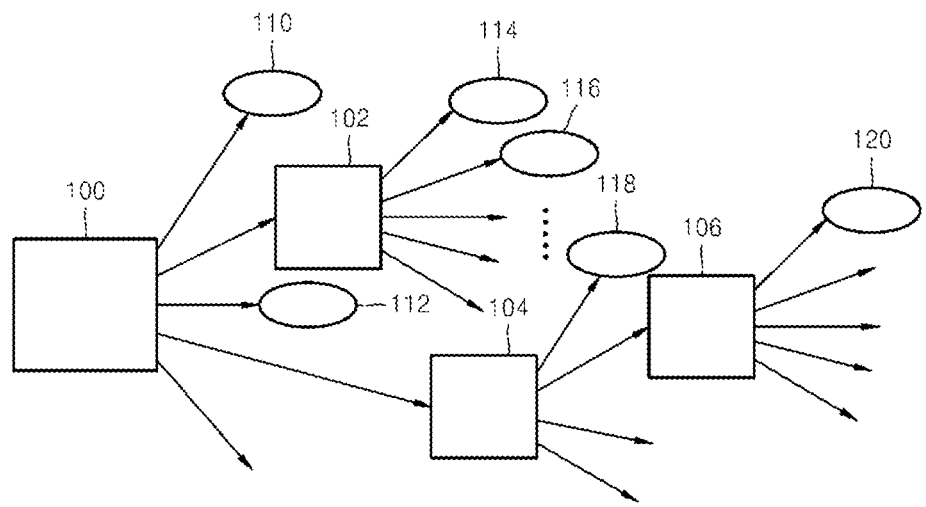
FIGS. 4 and 5 illustrate other examples of an optical interconnection network of the main signal processor and the sub signal processors included in a display according to exemplary embodiments.
Figure 5:
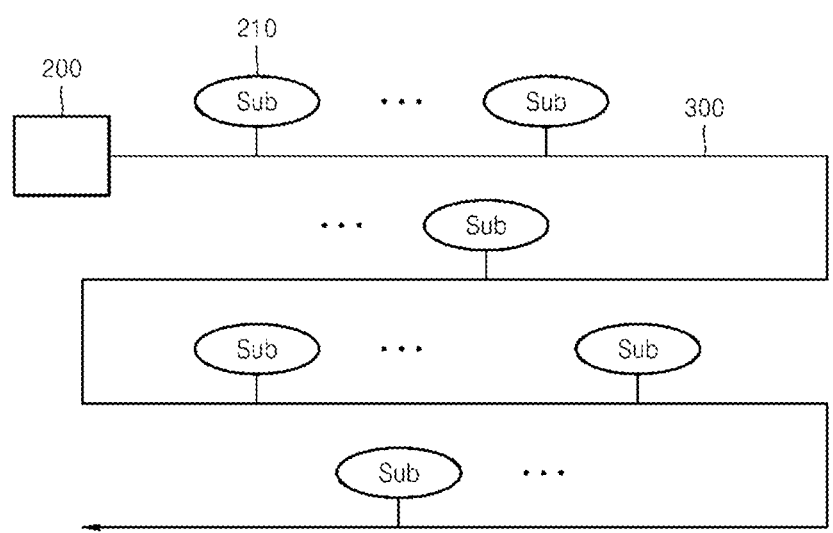

FIGS. 4 and 5 illustrate other examples of an optical interconnection network between a main signal processor and sub signal processors included in a display according to exemplary embodiments. The optical interconnection networks illustrated in FIGS. 4 and 5 are different from the optical interconnection networks illustrated in FIGS. 1 and 3.

Referring to FIG. 4, the optical interconnection network includes a first main signal processor 100 and a plurality of second main signal processors 102, 104 and 106. The second main signal processors 102, 104 and 106 may also be referred to as sub main signal processors. Only three second main signal processors 102, 104 and 106 are illustrated, but a greater number of the second main signal processors may be included in the optical interconnection network according to other exemplary embodiments. Also, the number of the second main signal processor 102, 104 and 106 may be smaller than the number of the sub signal processors which are included in the optical interconnection network.

Hereinafter, for convenience of explanation, the three second main signal processors 102, 104 and 106 will be referred to as first to third sub main signal processors 102, 104 and 106.

The first main signal processor 100 may be configured the same as or different from the main signal processor 32 in FIG. 1 and the main signal processor 60 in FIG. 3. The first main signal processor 100 is connected to the first and second sub main signal processors 102 and 104 through optical interconnections (denoted as an arrow in FIG. 4). First and second sub signal processors 110 and 112 are connected to the first main signal processor 100 through the optical interconnections. It is understood that more than the two sub signal processors 110 and 112 may be directly connected to the first main signal processor 100 through the optical interconnections. The first sub main signal processor 102 is connected to third and fourth sub signal processors 114 and 116 through optical interconnections. It is understood that more than the two sub signal processors 114 and 116 may be connected to the first sub main signal processor 102. The second sub main signal processor 104 is connected to the third sub main signal processor 106 and the fifth sub signal processor 118 through optical interconnections (denoted as arrows). One or more sub signal processors may be connected to the second sub main signal processor 104. In addition, one or more sub main signal processors are additionally connected to the first and second sub main signal processors 102 and 104. The first to third sub main signal processors 102, 104 and 106 may play a role of sub signal processors, respectively. Also, a portion of the first to the third sub main signal processors 102, 104 and 106 may be configured to perform the same functions as that of the first main signal processor 100.

A sixth sub signal processor 120 is connected to the third sub main signal processor 106 through an optical interconnection. One or more sub signal processors may be additionally connected to the third sub main processor 106.

The plurality of sub main signal processors shown in the network of FIG. 4 may be arranged according to a defined arrangement rule, or may be arbitrarily arranged. Also, the plurality of sub main signal processors may be arranged symmetrically or asymmetrically.

Arrows between the first main signal processor 100, the plurality of sub main signal processors 102, 104 and 106, and the sub signal processors 110 to 120 in FIG. 4 denote optical interconnections. The plurality of sub signal processors 110 to 120 are electrically connected to pixels, respectively. The network of FIG. 4 may further include a number of sub displays, and the number of the sub displays may be the same as the number of the sub signal processors, although is not limited thereto.

Referring to FIG. 5, an optical interconnection network includes a second main signal processor 200 and a plurality of sub signal processors 210. The optical interconnection 300 may be interconnected in a zigzag form as shown in FIG. 5, although is not limited thereto. One end of the optical interconnection 300 is connected to the second main signal processor 200. The plurality of sub signal processor 210 are arranged along the optical interconnections 300 and connected to the optical interconnections 300. The number of the sub signal processors 210 may be the same as the number of the sub displays.

As described above, according to the exemplary embodiments described above, a display includes and uses optical interconnections in a relatively long distance signal transmission and electrical interconnections in a relatively short distance signal transmission. The electrical interconnections may be used as interconnections in the sub display regions where a limitation due to an RC delay does not occur. Also, the electrical interconnections may be used as interconnections in the sub display regions where influence upon a real time operation does not occur even if the limitation due to the RC delay occurs.

Accordingly, high quality information may be implemented in real time in a large screen or a large display having a high resolution. In addition, real time implementation is enabled for a real 3D display or a hologram display based on an ultra fine size pixel or an ultra high speed pixel.

Therefore, according to exemplary embodiments, real time implementation is possible while other conditions of a display are maintained in an excellent state. Therefore, a display according to exemplary embodiments may be applied to various fields such as education, advertising, broadcasting, medical treatment and entertainment.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. A display comprising:
   a screen comprising a plurality of sub displays configured to display information;
   a plurality of sub signal processors electrically connected to the plurality of sub displays, and configured to perform conversion between an optical signal and an electrical signal; and
   a main signal processor optically connected to at least a portion of the plurality of sub signal processors,
   wherein the display is a single display.

2. The display according to claim 1, wherein a region of each of the plurality of sub displays has a size inversely proportional to a resistance-capacitance (RC) delay value of the region.

3. The display according to claim 1, wherein the plurality of sub displays is configured in a one to one correspondence with the plurality of sub signal processors.

4. The display according to claim 1, wherein the main signal processor is disposed at a center of the display.

5. The display according to claim 1, wherein the main signal processor is disposed outside the screen of the display.

6. The display according to claim 1, wherein the main signal processor comprises a converting element configured to convert an input signal having a first characteristic into an output signal having a second characteristic.

7. The display according to claim 1, wherein each of the sub signal processors comprises an electrical-to-optical converting element configured to convert an electrical signal received from a corresponding one of the sub displays into an optical signal.

8. The display according to claim 1, wherein the main signal processor comprises a hub configured to connect the main signal processor to the sub signal processors, a router configured to route data to and from the sub signal processors, and a processor to process the data.

9. The display according to claim 1, wherein each of the sub signal processors comprises an optical transceiver configured to perform the conversion between the optical signal and the electrical signal.

10. The display according to claim 1, wherein the main signal processor is connected to the sub signal processors by optical interconnections.

11. The display according to claim 10, wherein the optical interconnections comprise one of optical fibers and dielectric-based optical waveguides.

12. The display according to claim 1, wherein the display comprises one of a glass substrate, a flexible substrate, and a silicon-based substrate.

13. The display according to claim 1, wherein the display comprises a stereoscopic display or a non-glasses real three-dimensional (3D) display.

14. The display according to claim 6, wherein the input signal having the first characteristic comprises one of an electrical signal and an optical signal.

15. The display according to claim 6, wherein the output signal having the second characteristic comprises one of an electrical signal and an optical signal.

16. The display according to claim 6, wherein the converting element comprises one of an optical-to electrical converting element, an electrical-to-optical converting element and an optical-to-optical converting element.

17. The display according to claim 1, further comprising at least one sub main signal processor disposed between the main signal processor and the plurality of sub signal processors.

18. The display according to claim 17, wherein the main signal processor and the sub main signal processor respectively comprise a hub configured to connect the main signal processor and the sub main signal processor to other components, a router configured to route data to and from the other components, and a processor configured to process the data.

19. A display comprising:
    a plurality of sub displays configured to display images;
    a plurality of sub signal processors configured to control the plurality of sub displays; and
    a main signal processor configured to control the plurality of sub signal processors,
    wherein the plurality of sub displays, the plurality of sub signal processors, and the main signal processor are connected to each other by a combination of optical and electrical interconnections,
    wherein the display is a single display.

20. The display according to claim 19, wherein each of the plurality of sub signal processors is respectively connected to one of the plurality of sub displays by an electrical connection, and the main signal processor is connected to each of the plurality of sub signal processors by respective optical connections.

21. The display according to claim 19, wherein the plurality of sub displays are arranged in a grid format.

22. The display according to claim 19, wherein the sub displays comprise screens which are the same size.

23. The display according to claim 19, wherein the sub displays are implemented as touch screens.

24. A display comprising:
    a plurality of sub displays configured to perform an image display operation; and
    a plurality of hardware components configured to perform signal exchanges with each other and with the plurality of sub displays, to thereby control the image display operation,
    wherein optical connections are implemented for relatively long distance signal exchanges among the signal exchanges, and electrical connections are implemented for relatively short distance signal exchanges among the signal exchanges, the relatively short distance signal exchanges being shorter distances than the relatively long distance signal exchanges,
    wherein the display is a single display.

25. The display according to claim 24, wherein the plurality of hardware components comprise:
    a plurality of sub-signal processors respectively corresponding to the plurality of sub-displays; and
    a main signal processor to control the sub-signal processors,
    wherein the sub-signal processors are connected to the respective sub-displays by the electrical connections, and the main signal processor is connected to each of the sub-signal processors by the optical connections.

26. The display according to claim 25, wherein each of the sub-signal processors is configured to receive an optical signal transmitted from the main signal processor, convert the optical signal into an electrical signal, and transmit the electrical signal to a respective sub-display to control the corresponding sub-display to perform the image display operation.

27. The display according to claim 26, wherein the display is implemented as a touch screen, and
   each of the sub-signal processors is configured to receive user input in the form of an electrical signal according to a touching of the touch screen, convert the user input into an optical signal, and transmit the optical signal to the main signal processor to enable the main signal processor to control the image display operation.

28. The display according to claim 1, wherein the plurality of sub signal processors are configured to generate a converted signal which is used to control the plurality of sub displays.

29. The display according to claim 1, wherein the main signal processor is configured to control the at least a portion of the plurality of sub signal processors.

* * * * *